(12) United States Patent
Grunski et al.

(10) Patent No.: US 8,370,210 B2
(45) Date of Patent: Feb. 5, 2013

(54) METHOD FOR PROCESSING CASH PAYMENT FOR ONLINE PURCHASES

(76) Inventors: Ken Grunski, San Diego, CA (US); Matt MacAdams, San Marcos, CA (US)

( * ) Notice: Subject to any disclaimer, the term of this patent is extended or adjusted under 35 U.S.C. 154(b) by 0 days.

(21) Appl. No.: 12/912,736

(22) Filed: Oct. 26, 2010

(65) Prior Publication Data

US 2011/0225063 A1 Sep. 15, 2011

Related U.S. Application Data

(60) Provisional application No. 61/313,658, filed on Mar. 12, 2010.

(51) Int. Cl.
*G06Q 30/00* (2012.01)
(52) U.S. Cl. ...................... 705/26.1; 705/27.1
(58) Field of Classification Search .................... 705/26, 705/27, 26.1, 27.1
See application file for complete search history.

(56) References Cited

U.S. PATENT DOCUMENTS

2003/0177072 A1* 9/2003 Bared ............................ 705/26
2009/0320106 A1* 12/2009 Jones et al. ....................... 726/5

OTHER PUBLICATIONS

Lee et al. Securing Uniqueness of Rights e-Documents: A Deontic Process Perspective, Journal of Theoretical and Applied Electronic Commerce Research 3. 3 (Dec. 2008): 83-102, downloaded from ProQuestDirect on the Internet on Nov. 19, 2012, 16 pages.*

* cited by examiner

*Primary Examiner* — James Zurita
(74) *Attorney, Agent, or Firm* — John K. Buche; Buche & Associates, P.C.

(57) ABSTRACT

A system and method for processing a cash payment for an online purchase is provided herein, including purchasing online from a payee at least one item of goods or services by a payer defining a transaction; generating a bill for an amount due to the payee by the payer for the item, the bill including a unique identifier for the transaction; paying for the bill in cash by the payer to a third party the amount due to the payee; confirming payer's payment in cash for the item to the payee; and delivering to the payee all or a portion of the amount due to the payee from the payer.

13 Claims, 2 Drawing Sheets

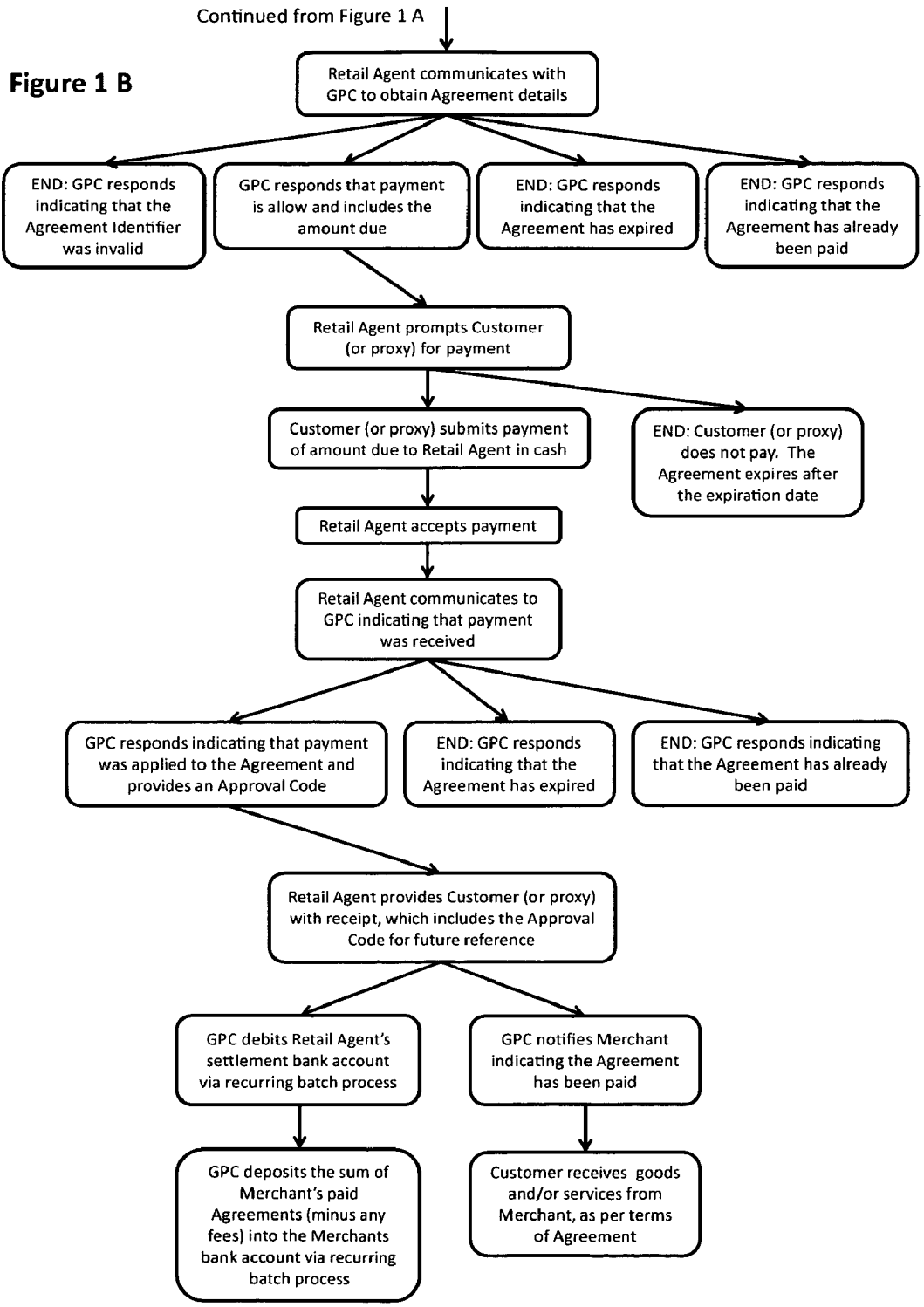

METHOD FOR PROCESSING CASH PAYMENT FOR ONLINE PURCHASES

CROSS-REFERENCE TO RELATED APPLICATIONS

This application claims the priority of U.S. Prov. Pat. App. Ser. No. 61/313,658 (filed Mar. 12, 2010) entitled "Method for Processing Cash Payment for Online Purchase" and its contents are incorporated by reference in their entirety.

STATEMENT REGARDING FEDERALLY SPONSORED RESEARCH OR DEVELOPMENT

N/A

BACKGROUND OF THE INVENTION

1. Field of Invention

The present disclosure generally relates to systems and methods for the remittance of funds for the purchase of goods or services of an online retailer.

2. Background

Online shopping is the examination of the goods or services of a retailer on the internet by consumers with the intent to purchase said goods or services. Online shopping has become a common worldwide alternative to in-store shopping. Frequently, online shoppers wish to purchase goods or services at the time of examination, and various systems or methods exist for accomplishing the remittance of purchasing funds to the retailer of the goods/services. For example, online shoppers can remit purchasing funds by: providing credit or debit card information to the retailer; providing Automated Clearing House (ACH) (a.k.a. eCheck) debit information to the retailer; providing the account information of a payment intermediary (e.g., PayPal®) who remits purchasing funds to the retailer; or, developing a line of credit from the retailer (or third party creditor (e.g. BillMeLater®)) who fronts the purchasing funds and invoices the shopper at a later date.

Although common, the known systems and methods of accomplishing the remittance of purchasing funds to retailers are not entirely satisfactory for online shopping. One cause, among others, of the stated dissatisfaction is that the known remittance methods do not permit the online shopper to pay with cash and instead require the use of a deposit or credit account. For example: purchasing funds cannot be remitted via a credit or debit card unless said card(s) is associated with a credit or deposit account; ACH cannot be used to remit purchasing funds unless an underlying deposit account exists; payment intermediaries require a user deposit account with the intermediary or an account with the intermediary that is associated with a credit or deposit account; and lines of credit, by definition, require a credit account. The requirement of a deposit or credit account is sometimes problematic in terms of an online shopper accomplishing the remittance of purchasing funds because: (1) many potential shoppers are unwilling or unable to use electronic funds transfer from a deposit or credit account (e.g., many potential online shoppers do not have a credit or deposit account due to mistrust of financial institutions, cultural or language barriers to account creation, seized or frozen accounts, or a preference to cash); (2) many potential online shoppers lack a sufficient credit rating for the creation of a credit account; and/or (3) many potential online shoppers do not want to have their credit/deposit account or other personal information directly associated with certain on line purchases. The requirement of a deposit or credit account is further problematic in terms of retailers receiving purchasing funds from an online shopper since consumer protections for deposit or credit account holders allow purchase cancelations and charge-backs. Accordingly, there is a need for systems and methods of accomplishing the remittance of purchasing cash by an online shopper (i.e., without the need for a credit or deposit account).

One option that exists for accomplishing the remittance of purchasing funds by an online shopper without the need for a credit or deposit account is the use of a prepaid gift-card. Prepaid gift-cards are typically "loaded" with cash-value and may later be used for online purchases. See, e.g., Green Dot®, www.mygreendot.com. However, gift-cards can be wasteful since the online shopper must purchase and load the card without presently knowing the cost of goods or services that will be purchased at a later time so that the customer may have to use the card to buy goods/services that cost less than the available balance on the card (e.g., a card having a $2.95 balance cannot be used to purchase goods/services of more than $2.95 in value and oftentimes it is difficult if not impossible to find goods/services with an exact value of $2.95). Furthermore, gift-cards usually have terms and conditions that can restrict the online shopper, impose fees that deplete or cancel card balances, or deny or restrict payments of interest on the card balance. Furthermore, such systems frequently require the establishment of an account and gift-cards are not specific to any single transaction. Due to these drawbacks, and others, a need still exists for systems and methods of accomplishing the remittance of purchasing funds by an online shopper without the need for a credit or deposit account, for example, by paying with cash.

Another option for accomplishing the remittance of purchasing funds by an online shopper without the need for a credit or deposit account is the use of a cash wiring service (e.g., Western Union®). For example, Continental Airlines® airlines has permitted the reservation and subsequent purchase of an airline ticket based on a promise to use and subsequent use of a cash wire transferring service to send purchasing funds to an franchise of the wire transferring service for retrieval by Continental Airlines®. See http://www.continental.com/web/en-US/content/booking/flight/westernUnion.aspx?Mobile=1 (last visited Oct. 14, 2010). However, such use of cash wiring services: (1) does not have an integrated online checkout so that the online shopper must fill out a lengthy physical form in an effort to identify the recipient retailer and to identify the cash amount they wish to transfer; (2) the recipient retailer must approach the cash wiring service in order to receive the funds; (3) cash wiring services use a proprietary network to accomplish the cash wiring instead of electronic funds transfer so that the service fees are higher; and/or (4) the shopper must identify to the recipient retailer the physical location of the cash wiring service prior to remitting the cash. Furthermore, cash wiring services do not offer managed arrangements so that the customer can overpay and thereby lose money or underpay and thereby lose the desired goods or services (i.e., the wiring service does not know the amount the customer must pay for the goods and services of the retailer). For these reasons, and others, there still remains a need for systems and methods of accomplishing the remittance of cash purchasing funds by an online shopper (i.e., without the need for a credit or deposit account).

In addition to the methods for remitting purchasing funds identified above, various other types of systems and methods for remitting purchasing funds are disclosed in the U.S. patent and published patent application databases. As discussed below, these known purchasing fund remittance methods are also limited and do not meet all the needs of persons who are desirous of remitting cash for purchases made while online shopping without the need for a credit or deposit account.

U.S. Pat. No. 7,664,703 (issued Feb. 16, 2010) and U.S. Pub. Pat. App. No. 2007/0136189 (published Jun. 14, 2007) discloses an electronic deposit account that functions in the same manner as a gift card without being tied to a card medium, but which nevertheless features many of the online shopping drawbacks of gift cards. See U.S. Pub. Pat. App. No. 2007/0136189, para. [0052].

U.S. Pub. Pat. App. No. 20020082962 discloses a system of kiosks that functions in almost the same manner as cash wiring services, namely, that a payer may deposit cash into a kiosk whereafter a payee may retrieve cash at another kiosk. Of course, such a kiosk system has the same limitations in terms of online shopping as are disclosed above in connection with cash wire transfer services.

U.S. Pat. Nos. 6,945,457 (issued Sep. 20, 2005) and 7,660,767 (issued Feb. 9, 2010) and U.S. Pub. Pat. App. No. 2002/0004781 disclose combination internet and ATM kiosks wherein users may access the internet, shop online, and deposit cash into the ATM as a mechanism for remitting purchasing funds. The disclosed combination ATM/internet kiosks are not adequate for those online shoppers who desire shopping in the privacy of their own home.

U.S. Pat. No. 7,487,127 (issued Feb. 3, 2009) discloses a method for online shopping wherein a retailer who is unwilling or unable to accept electronic payments (e.g., credit, debit, or ACH transfers) is paid in cash. Basically, such a system is akin to known purchase fund remittance methods plus cash wire transfer services so that the retailer can retrieve cash. This disclosed system does not address the needs of an online shopper who is unwilling or unable to remit purchasing funds electronically (i.e. unwilling or unable to use a deposit or credit account for remitting purchasing funds).

While not entirely analogous or applicable to online shopping, U.S. Pat. Nos. 5,616,902 (issued Apr. 1, 1997), 7,206,759 (issued Apr. 17, 2007), 7,627,524 (issued Dec. 1, 2009) and 7668766 (issued Feb. 23, 2010) and U.S. Pub. Pat. App. Nos. 2003/0097332 (published May 22, 2003) and 2002/0152165 (published Oct. 17, 2002) disclose the geographic placement of kiosks for utility (e.g., telephone, gas, electricity, etc) consumers to pay bills using cash. While the kiosk-type bill collectors do permit the payment of cash, the underlying bills/invoices are the result of the issuance of a line of credit or account for the utility customer whereby such a system is not completely anonymous to the shopper. Another drawback of these billed systems is that the retailer must advance a good or service with the expectation that the bill will be paid at a later date (e.g., utility, telephone, cable etc.). Because the goods or services are advanced, these types of remittance methods feature many of the limitations of a credit account, and others. U.S. Pub. Pat. No. 2004/0019559 discloses a similar system wherein a third party payment service providers (PSP) is directed by a payer to pay a bill or invoice instead of a kiosk. U.S. Pub. Pat. No. 2005/0033690 also discloses a similar system with similar drawbacks.

Yet still, known methods for purchasing goods online are inadequate in terms of the manner by which ownership of the purchased goods is transferred to the shopper. Typically, the purchased goods have been delivered to a physical address of the shopper (whether located at the shopper's home, post office, or shipping warehouse) in order for the merchant to transfer ownership of the goods. However, this method of ownership transfer is not entirely adequate for those online shoppers that either do not possess a physical address (e.g., a homeless person, a transient person, or an illegal alien), do not want the purchased goods delivered to their physical address due to the nature of the purchased goods, or desire anonymity. Accordingly, there is a need for methods of online shopping wherein ownership of the purchased goods may be transferred to the shopper without the need for the shopper to provide his/her physical address.

In view of the recited inadequacies of known remittance methods for use during online shopping, this application discloses methods and systems for the remittance of cash by an online shopper as the purchasing form for the goods or services of an online retailer.

SUMMARY OF THE INVENTION

It is an object of the present disclosure to provide a system and related methods of accomplishing the remittance of cash purchasing funds by an online shopper. The recited objective may preferably be met by a method of remitting cash to purchase the goods or services of an online retailer. In a preferable embodiment, the method comprises the steps of: selecting at least one good or service offered for sale online by a retailer for a price; executing an online checkout to establish a time-sensitive unilateral contract (The contract is preferably unilateral since only the merchant/retailer makes any type of promise, e.g., a promise to provide the good or service upon remittance of the price within a specified time-frame), and wherein the contract features a unique identifier; populating a database with at least data signifying the price and associated with other data signifying the unique identifier; referencing the unique identifier to an agent of the retailer so that the agent can query the database with the unique identifier to return at least the price; remitting cash in the amount of the price to the agent; populating the database with data signifying that cash in the amount of the price has been remitted; querying the database with the unique identifier so that the retailer can confirm performance of the contract; transferring the good or service to the shopper; and, providing funds in an amount equal to or less than the price to the retailer.

To further meet the above identified objective, another embodiment disclosed herein may be a method for processing a cash payment for an online purchase, including: a payer selecting from a payee at least one item of goods or services; the payee offering, via an on-line checkout, said item for a monetary amount to be due to the payee by the payer for the item, wherein acceptance of the offer may only be made by the performance of remitting the monetary amount due, and wherein the offer includes a unique identifier; populating a database with data regarding at least the price and the unique identifier, wherein the price is associated with the unique identifier; physically visiting a geographic location occupied by an agent of the payee; querying the database with a representation of the unique identifier so that the agent is informed of the amount due; rendering the offer legally enforceable by remitting the amount due in cash to the agent of the payee; populating the database with data defining an indication of the amount due being received by the agent, the indication being associated with the unique identifier; confirming payer's cash remittance for the item to the payee by querying the database with the unique identifier and observing the confirmation data; providing the item to payer; and delivering to the payee all or a portion of the amount due to the payee from the payer.

Other objectives of this disclosure are, without limitation: to provide a method of making an online purchase that avoids the drawbacks of prepayment mechanisms; to provide a method of making an online purchase without the need for a credit account; and, to provide a method of making an online purchase without the need for a credit or deposit account by the purchaser and without the need for an advancement of goods and services by the online retailer. It is yet another object of the present application to meet the aforementioned needs without any of the drawbacks associated with systems and methods heretofore known for the same purpose. It is yet still a further objective to meet these needs in an efficient and inexpensive manner.

BRIEF DESCRIPTION OF THE FIGURES

The manner in which these objectives and other desirable characteristics can be obtained is better explained in the following description and attached figures in which.

Figure 1:
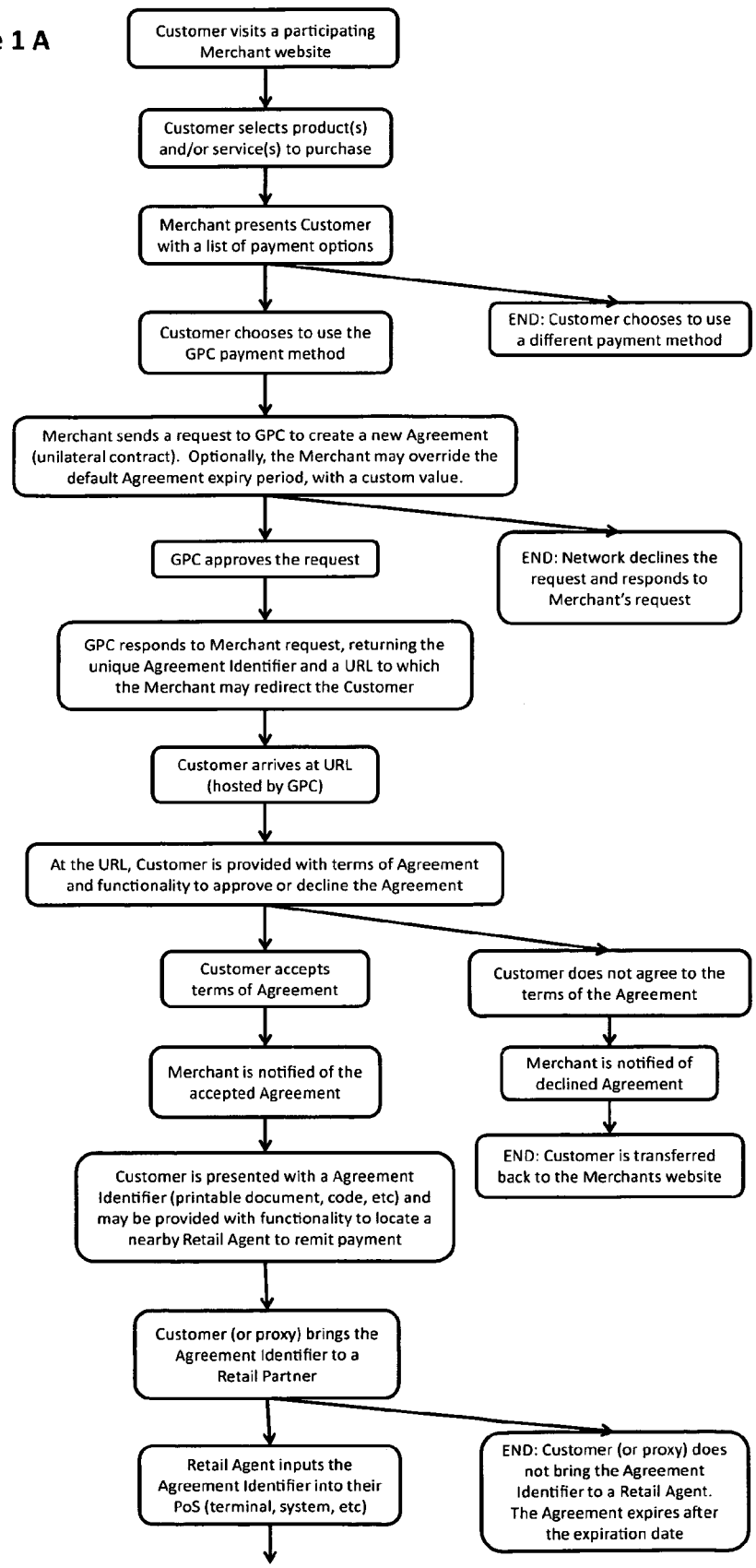
FIGS. 1A and B are a flow chart of an embodiment of a method for processing a cash payment for an online purchase.

It is to be noted, however, that the appended figures illustrate only typical embodiments disclosed in this application, and therefore, are not to be considered limiting of its scope, for the invention may admit to other equally effective embodiments that will be appreciated by those reasonably skilled in the relevant arts.

DETAILED DESCRIPTION OF PREFERRED EMBODIMENTS

Further objectives and advantages of the present invention will become apparent as the description proceeds. To gain a full appreciation of the scope of the present invention, it will be further recognized that various aspects of the present invention can be modified and/or combined to make desirable embodiments of the invention. Unless defined otherwise, all technical and scientific terms used herein have the same meaning as commonly understood by one of ordinary skill in the art to which this invention belongs. Where a term is provided in the singular, the plural of that term is also contemplated.

The present disclosure provides online shoppers with a convenient, efficient, and simple method to pay with cash for the goods or services of an online retailer. Utilizing the methods and systems of the present invention, cash shoppers can pay for online goods or services without having to resort to credit or deposit accounts. Very generally, this patent application discloses a system wherein at least one third party intermediary can be authorized by an online offeror (e.g., an online merchant or retailer) and made available at a geographic location to accept cash that is remitted during the performance by an online offeree (e.g., an online shopper) of a unilateral contract for the sale of goods or services. In one embodiment, the shopper may select a good or service offered online by the merchant/retailer and, during online checkout, establish a unilateral contract for the purchase of the good/service, wherein the merchant/retailer promises to transfer ownership of the good/service to the shopper in exchange for the remittance to the third party intermediary of the amount of the purchase price of the good/service. Suitably the contract may be time sensitive. The third party intermediary may, during the online checkout process, assign a unique identifier to the contract and record the identifier in a database in association with at least the price of the good/services. Later, the intermediary may provide at least one agent at a geographic location wherein the shopper may physically (1) reference the unique identifier of the contract so that the agent may access the database to observe the purchase price, and (2) deliver cash in the amount of the purchase price to the agent. Performance of the contract, by the shopper will be recorded in the database in association with the unique identifier so that the merchant/retailer may be informed of its obligation to transfer ownership of the purchased good/service by querying the database. In one embodiment and agent of the third party intermediary may be, for example, (a) employees, cash registers or kiosks at retail chains or (b) employees, cash registers, or kiosks of authorized but non-affiliated retail chains (e.g., gas stations, supermarkets, and various other types of convenience stores). Suitably, the agents may be made available seven (7) days a week and twenty-four (24) hours a day so that online shoppers may have uninterrupted access to pay cash for online purchases.

In an exemplary embodiment of the subject matter disclosed, an online shopper may preferably select a good or service to be purchased from an online merchant/retailer, wherein the merchant/retailer suitably provides a cash payment option to the shopper during online checkout. Suitably, online checkout processes are well known to those of skill in the art and will be readily adaptable by merely providing a pay with cash option in addition to the other forms of fund transfer options. It should be noted that a shopper may, instead of completing the checkout himself or herself, telephone a representative of the merchant, wherein the representative completes the online checkout under the telephonic direction of the shopper. Preferably, IF the cash payment option is selected by the shopper, THEN the merchant/retailer presents, during checkout, a unilateral contract to the shopper wherein the retailer promises to provide the good or service to the shopper upon remittance by the shopper of the purchase price to a designated third-party intermediary. The contract is preferably unilateral since only the merchant/retailer makes a promise. The third party intermediary, during checkout may preferably assign the contract a unique identifier wherein the unique identifier is populated to a database in association with at least the price of the good or service in the contract. The shopper can receive a document that evidences the contract shortly after the checkout, which document, for example, may be generated by the online merchant's website directly or e-mailed to the customer separately. The generation of such a document will be well known to those of skill in the art and can be accomplished in the same manner in which the receipt of an online transaction is generated. The document may feature the unique identifier for the contract, such as a barcode, serial number or any other suitable unique identifying markings, which the customer can print or otherwise take to an agent of the third party during performance (i.e., remittance of the purchasing cash) of the unilateral contract. As alluded to above, data representing the unique identifier and data representing at least the price may be associatedly populated to a database by the third-party intermediary so that an agent of the third party intermediary can query the database with the identifier and observe the amount to be paid by the shopper under the contract upon presentation of the identifier by the shopper to the agent. Observing or otherwise reading data, digital or otherwise, on a database is well known in the art and such knowledge is readily applicable to the disclosed subject matter. The agents, positioned at various geographic locations, can utilize the unique identifier of the document to reconcile the cash payment received from the shopper for the goods and/or services sold by the online merchant. Upon receipt of the cash by the agents, data representing the receipt may be populated to the database and may further be associated with the unique identifier so that the merchant/retailer may query the database with the unique identifier to observe receipt of payment. The online merchant/retailer and the third party intermediary can enter into an agreement to decide whether cash or cash-value of equal to or less than the cash remitted by the shopper during performance of the unilateral contract is to be delivered to the online merchant/retailer. In some instances, all of the cash paid to the third party by the shopper, or an equivalent cash-value thereto, can be delivered to the online merchant/retailer, but, in other instances, an agreed upon portion of the cash paid to the third party by the customer, or the cash-value equivalent of said portion, can be delivered to the online merchant/retailer, wherein the balance can account for payment to the third party for providing the third party services, including accepting the cash from the shopper and delivering the money to the online merchant/retailer either directly, or through a processing network.

In another exemplary embodiment, after the creation of a unilateral contract evidenced by a document as described above, the shopper can provide the document with the unique identifier to the agent of the third party intermediary who may then analyze the unique identifier, for example, by scanning the barcode into the third party's intermediary's point of sale (POS) system. The POS system of the third party may electronically transmit a request for information relating to the unique identifier, such as the barcode or an identified transaction I.D., to a processing network for processing. In one embodiment the POS system queries the database to retrieve at least the price associated with the presented unique identifier. The processing network can reply to the electronic request with information, including the price (i.e., the total amount due to accomplish performance of the unilateral contract). Also, a unique confirmation code can be provided by the third party partner that can be used as a confirmation to the online merchant or the processing network as proof that performance (i.e., remittance of purchasing funds) was accomplished by the shopper and that the retailer must now perform its promise under the contract (i.e., provide the good or service purchased online). This confirmation can be populated to the database in association with the unique identifier so that queries involving the unique identifier will indicate that the contract has been performed by the shopper. Such confirmation code can also be presented to the shopper in electronic or paper format, such as a printed receipt or other suitable formats which can include the confirmation code.

Exemplary embodiments of the document, that that may be generated to evidence a unilateral contract for the purchase of item(s) from the online merchant/retailer by the shopper, can include a large barcode that can be formatted to include a combination of multiple pieces of data, such as a unique Universal Product Code (UPC), then a colon, and followed by the unique identifier, e.g., transaction id. When the document is scanned by the third party into its POS system, the POS system can be configured to identify both the UPC and the unique identifier. This capability can allow the third-party to obtain all of the information required for the customer to perform the contract in one single scan.

The present application may include several embodiments for notifying the merchant of the shopper's performance of the contract. For example, upon successful performance of purchasing cash remittance, the shopper may receive a confirmation code as evidence of performance so that the shopper can provide proof of the performance to the online merchant/retailer by way of visiting the website of the online merchant/retailer directly, wherein the confirmation code may thereafter be entered in an appropriate entry field. The merchant may thereafter query to the database with either the confirmation code to see which contract the code corresponds to via its association with the unique identifier. Alternatively, the third party can communicate the confirmation code to the online merchant directly, or the confirmation code can go through a processing network and be entered by the customer or the third party to finalize the contractual performance by the shopper and complete the transaction, and this processing network can send the confirmation to the online merchant/retailer. In one embodiment, the third party can deliver all or a portion of the funds to the processing network, and this processing network can deliver all or a portion of the funds to the online merchant.

Some embodiments of the disclosed subject matter can include a currency converting step. In said embodiments, a cash paying online shopper may be located anywhere in the world and yet be able to perform the unilateral purchasing contract via remitting different types of currencies to the agent of the third party at a local geographic location. For example, an online shopper in Germany can select an item from an online merchant located in the U.S. and receive evidence of a unilateral contract for the purchase of the item, wherein the contract indicates that the shopper's performance is the remittance of the purchase price of the item in US dollars. Suitably, the shopper may remit a non-U.S. currency (e.g., Euros) with a monetarily equivalent Dollar value as the purchase price to a Germany located agent and yet still perform under the contract.

The subject matter disclosed can be a system for exchanging funds based and not based on a payer account. The cash online shopper can select online merchants who provide the herein described method of cash payment, and also independently select (with our without notifying the merchant) the agent of the third party intermediary where, or to whom, the cash payment should be remitted. Unless required by law, online shoppers do not need to establish a customer account because the shopper does not have to remit the purchase price directly to the online retailer or pay a processing network. Rather, the shopper can remit funds to the agent in cash. Any confirmation code, reference code, or unique identifier for the contract, or performance thereof, are not customer accounts because they are not shopper specific. This allows the customer to shop online and purchase an item anonymously. The customer can simply make a cash payment to the agent of his or her choice.

The subject matter generally disclosed by this specification may be systems and methods for online shoppers to remit cash to an agent of a third party, wherein said remittance accomplishes the shopper's performance of a unilateral contract for the purchase of a good or service of an online merchant retailer. In one preferable embodiment: the online shopper selects a good or service of an online retailer; during electronic checkout by the online shopper, the shopper selects a cash payment option and the online retailer establishes a time-sensitive unilateral contract for the purchase of the good or service, wherein the retailer promises to transfer ownership of the good or service to the shopper if the shopper remits a purchase price to an agent of the retailer within a specified timeframe; the contract may be preferably assigned a unique identifier by the third party; suitably, data signifying the unique identifier may be populated to a database in association with data signifying the contract term or terms; the agent of the third party may query the database with the unique identifier wherein IF the timeframe has not lapsed, THEN the agent may be informed of the purchase price, ELSE the agent is informed that the contract is expired; IF the contract is not expired, THEN the agent may accept remittance of cash in the amount of the price, and a confirmation code that evidences the cash remittance may be generated; data signifying the confirmation code can be populated to the database in association with the unique identifier; the confirmation code may be communicated to the retailer so that ownership of the good or service can be transferred to the shopper; the remitted cash, or a portion thereof, may be provided from the third party to the retailer.

Initially, the third party intermediary may agree to terms and conditions with the online merchant/retailer, the terms and conditions minimally including that the Third party, or its agents, will accept cash payments from the online customer for the goods or services of the online merchant/retailer. Other terms and conditions, for instance, the third party's compensation under the agreement or the manner by which the cash payments will be transferred from the third party to the online merchant/retailer, may vary. Next, the intermediary provides to the online merchant/retailer software which interfaces with the merchant/retailer's online checkout software so that, among other things: (1) the online shopper may select a cash payment option; (2) the shopper and merchant receive a document with a unique identifier evidencing a time-sensitive unilateral contract wherein the merchant retailer promises to provide a good or service in exchange for the remittance of the purchase price to the agent within a time period; (3) data representing the terms of the contract and the unique identifier are associated in a database; (4) the geographic locations of an agents who accept purchasing cash are provided to the online shopper; (5) notice is provided to the online merchant/retailer and optionally to the shopper whenever the time period set forth in the contract expires; (6) notice is provided to the agent if a shopper attempts remittance of purchasing funds after the expiration of the contracts. The agent may be one or more employee, cash register, kiosk, and the like of the intermediary or authorized but unaffiliated retail location which operate computer hardware and software wherein the unique identifier may be input so that the software: (1) searches the database for associated data and identifies to the agent at least whether a contract with the input identifier actually exists, and, if so, (a) whether the contract is expired (i.e., the time period for performance under the contract is over) or previously satisfied (i.e., the purchase price has already been received by the third party) or (b) the amount due for performance of the contract terms by the shopper; and, (2) generates a confirmation of contract performance, preferably evidenced by a confirmation code, wherein the data signifying the confirmation code may be populated to the database in association with the unique identifier.

The disclosed system for remitting cash for an online purchase may be facilitated with hardware that hosts a database and with computer hardware that is coupled with the database and which includes program code in the form of modules. Any design methodology may be utilized to implement a design for embodiments of the invention including but not limited to object oriented design. Any programming language may be utilized to implement the program code of the modules including any high level language, assembly language or microcode. The modules are configured to: (1) gather content from the online checkout related to the terms and conditions of the unilateral contract (e.g., the good or service, the purchase price, and the timeframe for cash remittance to an agent of the third party intermediary); (2) generate a unique identifier for said terms; (3) populate the database with the gathered content, the content being associated with the unique identifier; (4) produce a document evidencing the contract and featuring the unique identifier; (5) gather content related to the performance of the contract (e.g., collect data indicating that cash has been remitted); (6) populate the database with the content related to performance, the content being associated with the unique identifier; and (7) communicate the content related to performance to the online merchant/retailer. Suitably, the program code may be executable on the internet.

In yet another embodiment, the third party intermediary may feature multiple agents at various geographic locations. Methods and systems of remitting cash for an online purchase with a third party intermediary may be practiced as follows. First, an online shopper may select at least one good or service (hereinafter "the item") of an online merchant while visiting the merchants website. Second, the customer may proceed to an electronic checkout with an intent to purchase the item for a price. Third, the customer may be presented with a list of payment options for paying the price, including the option to pay with cash. Fourth, IF the shopper selects the pay with cash option, THEN a time sensitive unilateral contract may be created wherein the merchant promises to transfer ownership of the item to the shopper upon the shopper's remittance of cash in the amount of the price to an agent within a timeframe, ELSE the customer may proceed under one of the other payment options OR the check out may be terminated. The timeframe may be defaulted to a particular length or the timeframe may be selectable by the merchant/retailer or the shopper. Fifth, the merchant/retailer preferably communicates the terms of the contract, whether programmatically during the checkout or otherwise, to the third party intermediary. Said communication is preferably electronic and accomplished according to well known communication methods. Sixth, the intermediary may generate a unique identifier for the contract and data signifying the contract (including at least the item, the price, the timeframe, the) may be populated to an online database, the data being associated with the unique identifier. Seventh, the entity may produce a document that evidences the contract and features the unique identifier readable thereon. Eighth, the shopper may be electronically presented with the document and the functionality to identify an intent to perform the terms of the contract. For example, the shopper may be directed to the third party intermediary's website wherein the document is presented to the shopper along with a query about whether the shopper intends to perform the contract. For another example, the shopper may be sent an email with a query about whether the shopper intends to perform the contract. Ninth, IF the shopper represents to the intermediary an intent to perform the terms of the contract, THEN the intermediary may notify the merchant of the intent and the terms of the contract, ELSE the intermediary may notify the merchant that the shopper has no intent to perform the terms of the contract. Tenth, the shopper may be directed to provide the unique identifier to an agent of the intermediary that is most geographically proximate to the shopper, or any other of the intermediary's agents. Eleventh, IF data regarding the contract is associated with data representing the unique identifier AND the unique identifier is presented to an agent prior to the expiry of the timeframe, THEN the agent may access the online database and, via associations with the unique identifier, extract data including at least the price, ELSE the contract expires AND said expiration is communicated to the shopper and/or retailer/merchant. Twelfth, the agent may direct the shopper to remit the purchase cash wherein IF cash in the amount of the price is remitted to the agent, THEN the agent populates the database with data that indicates performance by the shopper of the contract terms, ELSE the twelfth step is repeated. Thirteenth, the merchant may be notified by the intermediary of the shopper's performance. Fourteenth, IF the intermediary and/or agent have a fee for its services, THEN the cash or cash value in the amount of the price less the fee is provided to the merchant, ELSE the cash or cash value in the amount of the price is provided to the merchant. Finally, ownership of the item is transferred to the shopper by the merchant.

In one non-limiting embodiment, the merchant/retailer may transfer ownership of the purchased item to the shopper according to known methods, including the delivery of the item to the physical address (e.g., home, P.O. Box, work, UPS account, etc.) of the shopper (or related to the shopper, e.g., family, work acquaintance). The physical address of the shopper may be communicated to the merchant/retailer during the online checkout process, and such aspects of the checkout process are well known to those of skill in the art.

In another embodiment, the merchant/retailer may transfer ownership of the purchased item to the shopper without delivering the item to the physical address of the shopper. Instead, the item may be delivered to the physical location of the agent of the third party as a shipping address whereby the shopper may approach the agent to pick-up the purchased item. In other words, the agent may function as a drop-shipment or drop-ship location. Thus, in the alternative embodiment, an agent of the third-party may receive cash for the online purchase of an item of goods or services as disclosed above, and may also receive delivery of the purchased item from the merchant so that the shopper can return to the agent and pick-up the item without ever providing his/her physical address. In a first scenario, the physical location of the agent of the third party may be designated as the shipping address during the online checkout of the shopper. Preferably, such a designation may be made during checkout, wherein the shopper may select an agent to where the item should be delivered from a list of agents or may enter a zip code to where the customer would like the item delivered so that the checkout software can programmatically determine the physical location of the closest agent to the identified zip code and designate said closest agent as the drop-shipment location. In a second scenario, the shopper may designate the physical location of the agent as a drop-shipment point to receive the purchased goods after checkout, wherein the shopper makes such a designation to the third-party or the agent with reference to the unique identifier so that the third-party or agent may communicate such shipment information to the merchant in the manner discussed above in connection with communicating performance of the contract to the merchant. By designating the agent as a drop-shipment point, the customer may remain anonymous while accomplishing the online purchase.

Suitably, the agent need not retain possession of purchased items indefinitely. Preferably, the agent or third-party may designate a timeframe by which the shopper must pick-up the items, after which timeframe the items will be returned to the merchant or discarded. Any fees for the agent associated with the drop-shipment services may suitably be paid by the shopper at the time of pickup or built into the terms of the contract to be paid when the purchasing funds for the item are remitted as discussed above.

FIGS. 1A and 1B depict a flowchart of a preferable method of remitting cash for the online purchase of an item of goods or services. In the flowchart: the "customer" represents an entity heretofore referred to as "online shopper;" "Merchant" represents an entity heretofore referred to as "online merchant/retailer;" "GPC" represents an entity heretofore referred to as "third-party;" and, "Retail Agent" represents an entity heretofore referred to as the "agent of the third-party."

Please note that all headings in this disclosure are for the convenience of the reader and should not be used to limit the meaning of the text that follows the heading, unless so specified. Various changes and departures may be made to the present invention without departing from the spirit and scope thereof. Accordingly, it is not intended that the invention be limited to that specifically described in the specification or as illustrated in the drawings, but only as set forth in the claims. Although the invention has been described and illustrated with respect to exemplary embodiments thereof, it should be understood by those skilled in the art that the foregoing and various other changes, omissions, and additions may be made therein and thereto, without parting from the spirit and scope of the present invention.

It should be noted the associated description is of illustrative importance only. In other words, the depiction and descriptions of the presently disclosed embodiments should not be construed as limiting of the subject matter in this application. For example, the above identified unilateral contract may, in another embodiment, be bilateral or may not be a contract for goods or services. For another example, the price term of the unilateral contract may include the cost of the good plus any fees required by the third party intermediary or its agents. For yet another example, if multiple items are selected for purchase by a shopper, a time-sensitive unilateral contract may be established for each item individually whereby each item has a different timeframe for performance (e.g., a contract for the sale of a broom may be good for one week but a contract for a computer identified in the same online checkout may expire after one day) or all of the items may be offered for sale under the same time-sensitive unilateral contract with a single timeframe for performance (e.g., a contract for the sale of the broom and computer may expire after one day or one week) set by the merchant or shopper. Continuing the example, in the case where multiple items are designated in a single unilateral contract, the timeframes may be prioritized according to the longest or shortest time-period. Finally, the expiry period (timeframe) for accomplishing the performance of the contract by the shopper can be dependent on the demand of a product whereby the merchant can designate longer or shorter timeframes during high and low demand periods (e.g., the merchant may require shorter timeframes around Christmas or between thanksgiving and Christmas in an expectation that the demand of the product will be higher around these holidays).

We claim:

1. A method for processing a cash payment for an online purchase, comprising the steps of:

identifying an item of goods or services selected by an online shopper;

identifying a unilateral contract for the sale of the item by a payee at a price, wherein the contract is time-sensitive so that the performance by the shopper must be accomplished within a timeframe wherein the timeframe varies according to the demand of the item;

generating a unique identifier for the contract;

populating a database with a first data set signifying at least one term of the contract, said first data set associated with a second data set signifying the unique identifier;

receiving a physical representation of the unique identifier from the online shopper at a geographic location;

querying the database from the geographic location with the unique identifier and observing the data associated therewith;

prompting a cash payment for the price from the shopper;

receiving the cash as performance of the contract by the shopper;

generating via computer hardware with software installed thereon, a third data set signifying receipt of the cash and populating the database with the third dataset in association with the second dataset; and, delivering to the payee an equivalent of all or a portion of the cash.

2. The method of claim 1 wherein the item is two or more goods offered for sale online by the payee, and wherein the timeframe is based on the demand of one of said goods.

3. The method of claim 2 further comprising the step of delivering the item to an agent, and wherein the step of receiving the item is accomplished by the shopper picking-up the item from the agent.

4. The method of claim 2 further comprising the step of identifying an agent as the drop-shipment location during the online checkout.

5. The method of claim 1 wherein the contract is accepted by the online shopper via remitting cash.

6. A method for processing a cash payment for an online purchase, comprising the steps of:
  identifying an item of goods or services selected by an online shopper;
  identifying a unilateral contract for the sale of the item by a payee at a price, wherein the contract is for the sale of goods or services;
  generating a unique identifier for the contract;
  populating a database with a first data set signifying at least one term of the contract, said first data set associated with a second data set signifying the unique identifier;
  receiving a physical representation of the unique identifier from the online shopper at a geographic location;
  querying the database from the geographic location with the unique identifier and observing the data associated therewith;
  prompting a cash payment for the price from the shopper;
  receiving the cash as performance of the contract by the shopper;
  generating via computer hardware with software installed thereon, a third data set signifying receipt of the cash and populating the database with the third dataset in association with the second dataset; and,
  delivering to the payee an equivalent of all or a portion of the cash.

7. The method of claim 6 wherein the contract is time-sensitive so that the performance by the shopper must be accomplished within a timeframe.

8. The method of claim 7 wherein the timeframe varies between one day and 60 days depending on the demand of the item.

9. The method of claim 8 wherein the item is two or more goods offered for sale by an online merchant, and wherein the timeframe is based on the demand of one of said goods.

10. The method of claim 9 further comprising the step of delivering the item to an agent, and wherein the step of receiving the item is accomplished by the shopper picking-up the item from the agent.

11. The method of claim 10 further comprising the step of identifying the agent as the drop-shipment location during the online checkout.

12. The method of claim 8 wherein the item is two or more goods offered for sale by an online merchant, and wherein the timeframe is based on the demand of one of said goods.

13. A method for processing a cash payment for an online purchase, comprising the steps of:
  identifying an item of goods or services selected by an online shopper;
  identifying a unilateral contract for the sale of the item by a payee at a price, wherein the contract is for the sale of goods or services;
  generating a unique identifier for the contract;
  populating a database with a first data set signifying at least one term of the contract, said first data set associated with a second data set signifying the unique identifier;
  receiving a physical representation of the unique identifier from the online shopper at a geographic location;
  querying the database from the geographic location with the unique identifier and observing the data associated therewith;
  prompting a cash payment for the price from the shopper;
  receiving the cash as performance of the contract by the shopper;
  generating via computer hardware with software installed thereon, a third data set signifying receipt of the cash and populating the database with the third dataset in association with the second dataset; and,
  delivering to the payee an equivalent of all or a portion of the cash, wherein the shopper remits the cash in a first currency and wherein the payee is delivered an equivalent of the cash or a portion thereof in a second currency.

* * * * *